June 24, 1930. B. H. SMITH 1,768,425
COLLAPSIBLE FORK AND LIKE IMPLEMENT
Filed April 29, 1927
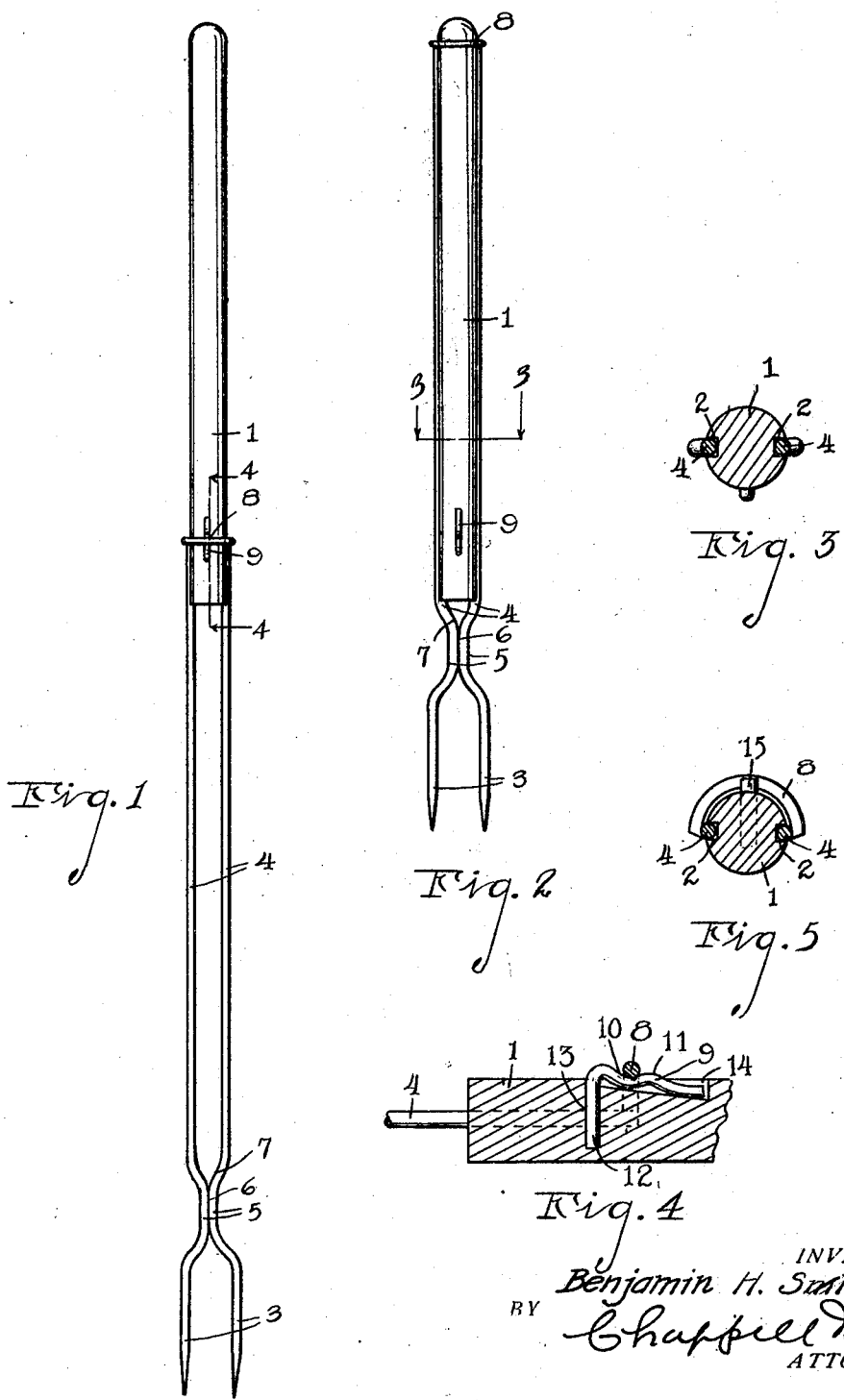
INVENTOR
Benjamin H. Smith
BY Chappell Earl
ATTORNEYS Patented June 24, 1930

1,768,425

UNITED STATES PATENT OFFICE

BENJAMIN H. SMITH, OF NILES, MICHIGAN, ASSIGNOR TO MICHIGAN WIRE GOODS COMPANY, OF NILES, MICHIGAN

COLLAPSIBLE FORK AND LIKE IMPLEMENT

Application filed April 29, 1927. Serial No. 187,449.

The main object of this invention is to provide a collapsible fork or like implement for campers, army or kitchen uses and the like, the handle of which may be compactly collapsed, and at the same time is strong and simple and durable in structure.

Objects relating to details and economies of construction and operation of my invention will appear from the detailed description to follow.

The invention is defined and pointed out in the claims.

A structure which is a preferred embodiment of my invention is illustrated in the accompanying drawing, forming a part of this specification, in which:

Fig. 1 is a view of my improved fork with the handle extended.

Fig. 2 is a view with the handle collapsed.

Fig. 3 is a cross section on a line corresponding to line 3—3 of Fig. 2.

Fig. 4 is a detail longitudinal section illustrating the means for retaining the handle in extended position.

Fig. 5 is a cross section illustrating a modification in the handle with means for supporting the handle in extended position.

In the drawing similar reference characters refer to similar parts throughout the several views.

Referring to the drawing, the handle 1, preferably formed of wood, has longitudinal oppositely facing grooves 2 therein.

The fork illustrated is a two-tine fork, the tines 3 being formed integrally with the shank members 4 of wire, the shank members being inwardly offset at 5, the offsets being welded, bent, twisted or soldered together at 6.

The grooves 2 are of such diameter as to slidably receive the shank members 4 so that the parts may be telescoped together, the handle collapsing against the shoulder 7 formed by the offsets 5.

The outer ends of the shank members are connected by a cross piece 8 embracing the handle which in the structure illustrated is soldered or welded to the outer ends of the shank members, retaining them in the grooves while permitting their sliding movement in the grooves.

To limit the extending of the handle and support the handle in extended position, I provide a spring catch 9 having a keeper recess 10 adapted to receive the cross piece 8 of the handle, the cross piece riding over the raised part 11 to engage the recess 10— see Fig. 4. This catch is formed of wire, one end being turned laterally to provide a securing prong 12 which is seated in a bore 13 transversely of the handle, the free end of the catch resting in a slot 14 in the handle. In Fig. 5, the catch is dispensed with, a stop pin 15 being substituted. The catch not only performs the function of a stop means but yieldingly retains the handle in extended position.

With the parts thus arranged, a handle of suitable length may be had for camp or other culinary purposes; at the same time the handle may be quickly and compactly collapsed.

The structure is economical to produce and the handle, when extended, is quite rigid.

Having thus described my invention, what I claim as new and desire to secure by Letters Patent, is:

In a fork, the combination of a handle having longitudinal oppositely facing grooves therein of substantial depth, a combined shank and tine member formed of wire and comprising a pair of tines and a pair of shank members, the shank members being inwardly offset and secured together at the base of the tines, the shank members being slidably disposed in said grooves in said handle, the grooves being of such depth as to enclose a substantial portion of the shank members arranged therein, a curved cross member connecting the outer ends of the shank members and disposed at one side of said handle to slidably embrace the same, said handle having a recess in its top adjacent its inner end, and a spring catch disposed in said recess to project therefrom into coacting engagement with said cross piece when the handle is in its fully extended position.

In witness whereof I have hereunto set my hand.

BENJAMIN H. SMITH.